Dec. 12, 1933.  L. G. NICHOLSON  1,938,972
MOTOR VEHICLE
Filed Aug. 5, 1930  2 Sheets-Sheet 2
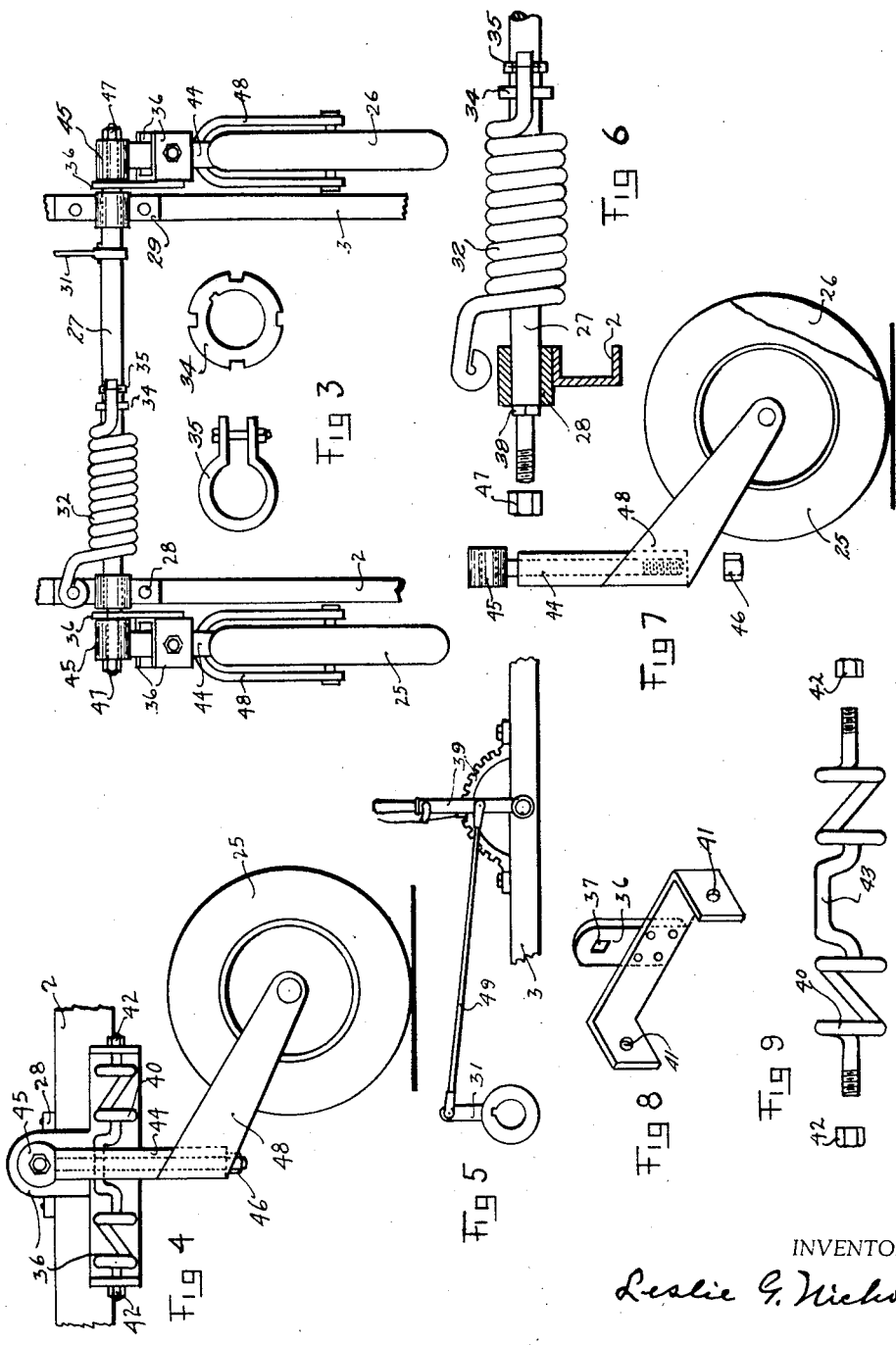
INVENTOR.
Leslie G. Nicholson Patented Dec. 12, 1933

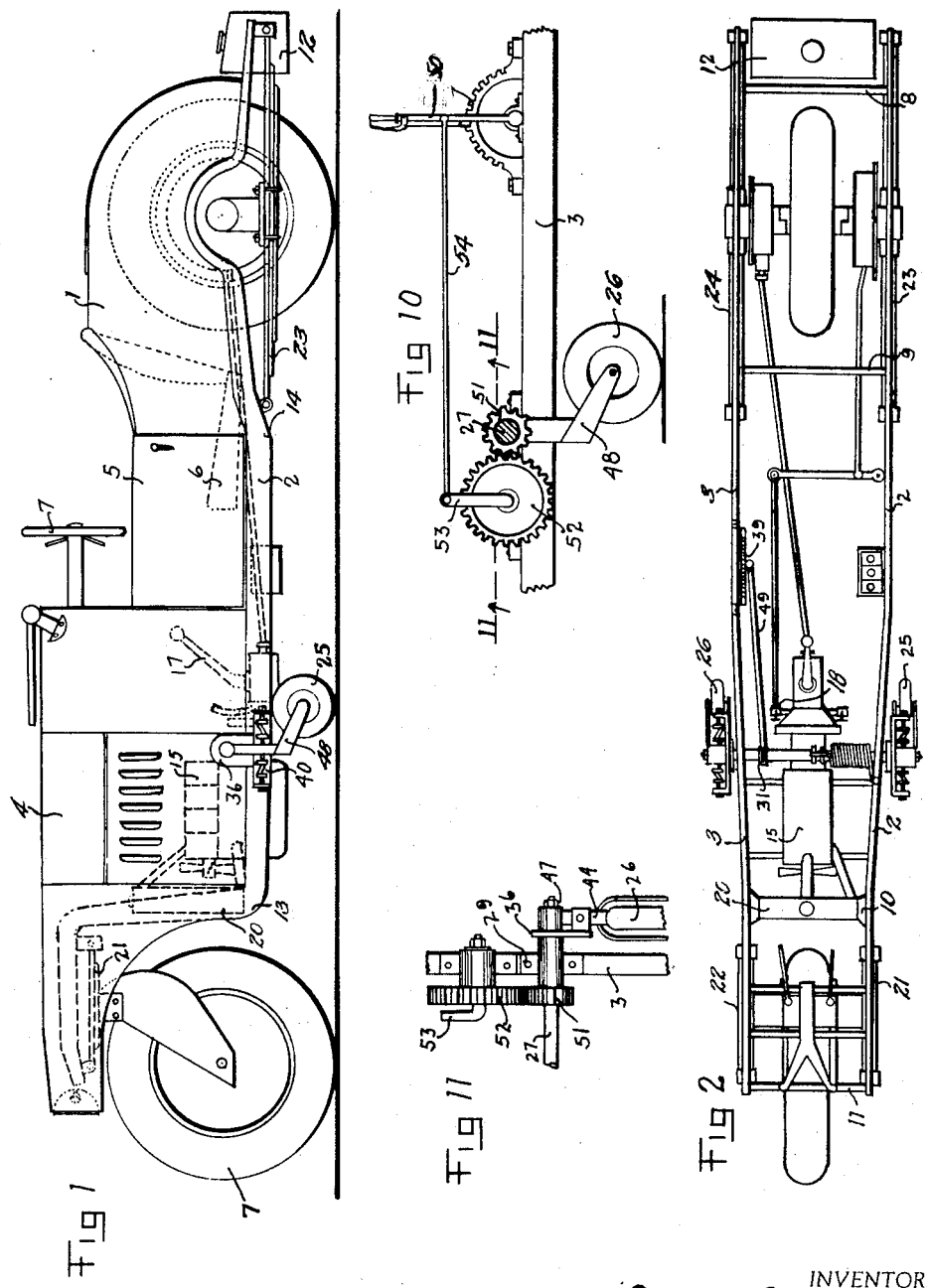

1,938,972

UNITED STATES PATENT OFFICE 1,938,972

MOTOR VEHICLE

Leslie G. Nicholson, St. Helena, Calif.

Application August 5, 1930. Serial No. 473,207

4 Claims. (Cl. 208—78)

My motor vehicle relates to improvements in motor vehicle wherein a body normally supported upon single front and rear wheels arranged in tandem is provided with emergency wheels to enable it to stop and pass through traffic without requiring the driver to hold the vehicle up. The two side wheels are held out of contact with the ground when the car is in motion and are arranged to be lowered very quickly when needed to prevent overturning.

The objects of my invention are;

First, to provide an improved two-wheeled motor vehicle.

Second, to provide an improved way for lowering or raising the side wheels very quickly when necessary, or to hold them out of contact with the ground when they are not needed. The side wheels are to prevent the motor vehicle from turning over when standing still or when travelling very slowly or when in traffic.

Other objects of the invention will be apparent as the description proceeds. An accomplishment of the invention is shown in the accompanying drawings in which the same reference numeral is applied to the same portion throughout the several figures of the drawings.

One form of the invention is illustrated in the accompanying drawings, in which Fig. 1 is a vertical view of the entire motor vehicle.

Fig. 2 is a plan view of the motor vehicle having the body removed.

Fig. 3 is a view of the side wheels on a larger scale than shown in Fig. 2, and showing the manner in which the side wheel shaft is mounted across the frame members, showing a side wheel mounted on each end thereof.

Fig. 4 is a side view of one of the side wheels on a larger scale, showing spring frame in position on end of side wheel shaft, a coil spring mounted within the spring frame, showing the square tubular member extending down through the square bend in the center of the coil spring.

Fig. 5 is a vertical side view of a hand lever for raising or lowering the side wheels, showing the actuating member removed from side wheel shaft and pivotally attached to end of rod.

Fig. 6 is a detailed section view of the side wheel shaft taken from Fig. 3, showing the squared part on the shaft adjacent to the bearing means.

Fig. 7 is a detailed view of one of the side wheels, showing the square tubular member, and manner in which the connecting rod may be removed therefrom.

Fig. 8 is a vertical front view of spring frame, showing the squared opening at top, which in turn fits on the squared part of shaft, as shown in Fig. 6.

Fig. 9 is a view of coil spring which mounts within the spring frame shown in Fig. 8, also showing the square bend in center of the coil spring.

Fig. 10 is a side view of device for raising and lowering the side wheels using two spur gears.

Fig. 11 is a detailed sectional view taken upon the line 11—11 of Fig. 10, showing the manner in which the smaller spur gear is mounted on shaft and the larger spur gear on another actuating member which is attached to the frame forward of said shaft.

Referring to the drawings, the numeral 1 in Fig. 1 is used to designate the body mounted upon the frame members 2, 3 as shown in Figures 1 and 2. The engine is covered with hood 4 which forms part of the body and operates similar to the automobile hood. The door 5 has a wide opening to seat 6, but there may be another door on the opposite side of body if required. Seat 6 is upholstered and made comfortable for ease in driving. The steering wheel 7 is placed the right distance from the back of seat 6 and from the frame members 2, 3 for ease and convenient driving.

In Fig. 2 the vehicle frame consists of two long frame members 2, 3 joined together with transverse bars 8, 9, 10 and 11 for holding the long frame members 2, 3 rigid and in place. At the rear of the transverse bar 8, and between the frame members 2, 3, is the gas tank 12.

Fig. 1. The long frame members 2, 3 have a vertical bend at front which extends forward over top on each side of steering wheel and secures to steering mechanism. Fig. 1 at 13 indicates this bend, and at 14 there is an upward bend for clearing the driving and braking mechanisms. The long frame members 2, 3 are brought low to the ground for the purpose of giving the motor 15 and seat 6 a lower center of gravity.

The water cooled motor is indicated at 15 in Figures 1 and 2, and the gear change box at 16, and the gear shifting lever at 17. The gear changing box is attached to the motor 15 and may have three or four speeds forward and a reverse. The drive shaft is attached to the gear change box 16, extending to the driving mechanism at rear. In Fig. 2 is shown the position of brake pedal 18 and the clutch pedal 19. The radiator 20 for cooling motor 15 is mounted between the frame members 2, 3 in the vertical bend shown at 13 and enclosed therein by the forward portion of the body 1. (See Fig. 1.)

In Figures 1 and 2 the long frame members 2, 3 are supported at the front by means of two semi-elliptical springs 21, 22 which are attached to the steering mechanism, and the rear ends of the frame members 2, 3 are supported by longer semi-elliptical springs 23, 24 which are attached to the driving and braking mechanisms.

In Figures 2 and 3 the side wheels 25, 26 are pivotally mounted on each end of shaft 27 which is journaled in bearings 28, 29 secured longitudinally to the frame members 2, 3. The actuating member 31 is keyed to the shaft 27 and shown in position in Fig. 3. On the opposite side from the actuating member 31 a coil spring 32 encircles the shaft 27, having one end attached to the bearing 28, and the other end attached to the shaft 27 by means of a clip 34 keyed on shaft 27 near the center. Clip 34 is provided with notches and the inner end of spring 32 extends through one of these notches and is clamped in place by clamp 35, (see Figures 3 and 6). A side view of clip 34 and clamp 35 is shown in the small drawings in Fig. 3.

The spring frame 36 shown in Fig. 8 has a squared opening 37 in the upper part thereof, which engages the squared part 38 of shaft 27. In Fig. 6 is shown the squared part 38 of shaft 27 adjacent to the bearing means 28. Each end of shaft 27 is built the same, each end having a squared part 38 adjacent to each of the bearing means 28, 29. There is a spring frame 36 mounted upon each squared part 38 on each end of shaft 27, and each spring frame 36 is held rigid and non-turnable thereon. The shaft 27 is rotated by the hand lever 39, and each spring frame 36 rotates with the shaft 27 in a circular manner.

Fig. 9. The coil spring 40 is mounted within the spring frame 36 as shown in Fig. 4. In the spring frame 36 there is a round opening 41 at each end thereof, for receiving the ends of coil spring 40 which extend therethrough, and are held in place within the spring frame 36 by means of nuts 42, which are threaded on each outward end thereof, and on the outside of the spring frame 36, as shown in Fig. 4. The coil spring 40 is flexible and may have three or four coils at each end if more flexibility is needed. In the coil spring 40 at the center thereof is a square bend 43 which forms a part of the said spring 40, as shown in Figures 4 and 9.

Figure 7. The side wheels 25, 26 are each designed the same and each operate in the same manner when mounted on each end of shaft 27 adjacent to each spring frame 36. The tubular member 44 is square and oblong, having a central opening through the center for receiving the stem part of the connecting rod 45. The stem part of the connecting rod 45 extends centrally through the tubular member 44 allowing the tubular member 44 to be pivotally adjusted thereon by means of nut 46, see Fig. 4. By pivotally adjusting the tubular member 44 on the connecting rod 45 provides means for turning the side wheels 25, 26 with the vehicle. In Fig. 4 the tubular member 44 and the connecting rod 45 are shown in place, as indicated by the dotted lines. When the nut 46 has been removed from the lower end of the stem part of the connecting rod 45, the said connecting rod 45 may be removed from the tubular member 44, see Fig. 7.

In Fig. 3 the connecting rods 45 are shown mounted on each end of shaft 27 adjacent to each spring frame 36. The connecting rods 45 are pivotally mounted on shaft 27, and each connecting rod 45 rests against each spring frame 36, holding each spring frame 36 in place on each squared part 38 of shaft 27 by the adjusting means 47 provided on each extreme end of shaft 27. In Fig. 4 the tubular member 44 extends downward from shaft 27 through the square bend 43 in the coil spring 40, and connects with the side wheel forks 48, which are attached to the lower end of the tubular member 44. The side wheels 25, 26 are mounted within the side wheel forks 48, as shown in Fig. 3.

The tubular member 44 which extends downward through the square bend 43 in the coil spring 40, is substantially held within the square bend 43 in the coil spring 40 by the stem part of the connecting rod 45. The tubular member 44 when mounted to the connecting rod 45 and placed within the square bend 43 in the coil spring 40 substantially holds the side wheels 25, 26 in straight travel alignment when moving forward or rearward. The coil spring 40 is yielding for ordinary turning of the vehicle, and when the side wheels 25, 26 are removed from the ground they immediately revert to that straight travel alignment position. The coil spring 40 is flexible when in action and provides resiliency for the side wheels 25, 26 when in contact with the ground or moving over an uneven surface. The side wheels assemblage is built and operated in the same manner on each side of the vehicle.

Figures 2 and 5. The hand lever 39 is the means used for raising or lowering the side wheels 25, 26 in or out of contact with the ground. The arch of the hand lever 39 is attached to the frame member 3 rearward of the actuating member 31 which is mounted on shaft 27. There are notches provided in the arch which is attached to the frame member 3 for holding the side wheels 25, 26 in any position required. The side wheels 25, 26 are lowered to the ground when the vehicle is standing still, and the hand lever 39 can be set stationary in one of the provided notches in the arch, thereby supporting the vehicle in a vertical position.

Figures 2 and 5. The hand lever 39 is provided with a rod 49 which is pivotally attached to the actuating member 31 at the forward end, and extends rearward to the hand lever 39 and pivotally attached thereto. The side wheel shaft 27 is rotated by forcing the hand lever 39 forward or rearward, thereby raising or lowering the side wheels 25, 26 in a circular manner. In Fig. 5 is shown the actuating member 31 removed from the shaft 27 and pivotally attached to the forward end of rod 49.

Fig. 3. The tension can be taken up on coil spring 32 which encircles shaft 27 by changing the end of spring 32 to different notches in clip 34, thereby providing a stronger tension on spring 32, which will automatically raise the side wheels 25, 26 to their carrying position when hand lever 39 is released. The tension coil spring 32 is shown encircling the shaft 27 in Figures 2, 3, 6.

Fig. 10. The hand lever 50 here shown is in connection with spur gears for operating the side wheels 25, 26. The smaller spur gear 51 is keyed to shaft 27, replacing the actuating member 31 shown in Figures 2, 3. The larger spur gear 52 is journaled to the frame member 3 forward of the smaller spur gear 51, and mounted upon another actuating member 53 which forms a shaft for spur gear 52 as shown in Fig. 11. The spur gear 52 is in mesh with spur gear 51, and the spur gear 52 rotates the spur gear 51 which is keyed to shaft 27. The forward end of rod 54 is pivotally attached to the actuating member 53, and extends rearward to the hand lever 50, and is pivotally attached thereto. The forward or rearward movement of the hand lever 50 rotates the larger spur gear 52, which rotates the smaller spur gear 51 that is keyed on shaft 27, thereby rotating shaft 27, which raises or lowers the side wheels 25, 26 in or out of contact with the ground. The spur gear 52 is larger in diameter than the smaller spur gear 51, thereby providing a shorter movement of the hand lever 50 when raising or lowering the side wheels 25, 26. The two spur gears 51, 52 when arranged together in the manner shown overcome a great amount of jerking on the hand lever 50.

What I claim as my invention, and particularly desire to secure by Letters Patent is—

1. In a motor vehicle having a frame supported on single front and rear wheels in tandem, a transverse shaft mounted on said frame at the forward end thereof, a side wheel pivotally mounted at each end of said shaft, bearings in which said shaft is mounted, a tension coil spring encircling said shaft and connected thereto at one end and at the other end to one of said bearings, an actuating member mounted on said shaft, a spring frame mounted on each end of said shaft, on a squared part thereon adjacent to each connecting rod and bearing member, means on each extreme end of said shaft whereby said connecting rods are secured thereon, a side wheel fork on each side mounted on an oblong tubular member, which is pivotally mounted to the lower part of each said connecting rod, a side wheel mounted within each said side wheel fork.

2. In a motor vehicle having a frame supported on single front and rear wheels in tandem, a transverse shaft mounted at the forward end of said frame, a tension coil spring encircling said shaft, a spring frame removably mounted on each end of said shaft, on squared parts thereon, a coil spring having a square bend at its center mounted within each said spring frame, a connecting rod mounted on each end of said shaft, a square tubular member extending downwardly through the said square bend in each said coil spring, supporting a side wheel fork at lower end, and is pivotally secured to the lower part of each said connecting rod, a side wheel mounted within said fork, and held resiliently in travel alignment by said coil spring, which gives for turning.

3. In a motor vehicle having a frame supported on single front and rear wheels in tandem, a transverse shaft mounted on said frame at the forward end thereof, side wheels mounted on the shaft, a tension coil spring encircling said shaft, which automatically raises the said side wheels to a carrying position when released, an actuating member mounted on the shaft, a hand lever secured to the said frame rearward of the said actuating member, a pivotally connected rod extends rearward from said actuating member to the said hand lever, said shaft being rotated by the forward or rearward movements of the said hand lever, which causes the said side wheels to engage and disengage the ground, means whereby said hand lever can be set stationary, when said side wheels are down, thereby supporting the vehicle vertically.

4. In a motor vehicle having a frame supported on single front and rear wheels in tandem, a transverse shaft mounted on said frame at the forward end thereof, a spur gear member mounted on said shaft, a second shaft mounted on the frame, forwardly of the first named shaft, a second spur gear member mounted on the second named shaft and meshing with the first named spur gear, and pivotally connected rod between the second mentioned spur gear member and the said hand lever, said hand lever engaging notches provided in rack secured to said frame, and side wheels mounted on the first mentioned shaft, whereby the moving forward or rearward of said hand lever rotates the said spur gear members and said shafts, causing the engaging and disengaging of said side wheels from ground, the engaging of said hand lever with said notches holding said side wheels in contact with the ground, or in the position required, and a tension coil spring encircling said first named shaft, whereby said side wheels are automatically raised to a carrying position when the said hand lever is released.

LESLIE G. NICHOLSON.